July 11, 1939.  R. C. MEALEY  2,165,934

VARIABLE SPEED TRANSMISSION MECHANISM

Filed April 19, 1937   3 Sheets-Sheet 1

Inventor
By Robert C. Mealey
Merchant & Kreyon
Attorneys

July 11, 1939.  R. C. MEALEY  2,165,934
VARIABLE SPEED TRANSMISSION MECHANISM
Filed April 19, 1937  3 Sheets-Sheet 2

Inventor
Robert C. Mealey
By Merchant Kilgore
Attorneys

July 11, 1939.  R. C. MEALEY  2,165,934

VARIABLE SPEED TRANSMISSION MECHANISM

Filed April 19, 1937   3 Sheets-Sheet 3

Inventor
By Robert C. Mealey
Merchant Kilyon
Attorneys

Patented July 11, 1939

2,165,934

UNITED STATES PATENT OFFICE 2,165,934

VARIABLE SPEED TRANSMISSION MECHANISM

Robert C. Mealey, Minneapolis, Minn., assignor of one-third to Jacob A. Ronning and one-third to Birdan E. Ronning Application April 19, 1937, Serial No. 137,604

5 Claims. (Cl. 74—293)

My present invention provides an improved variable speed power-transmission mechanism and, generally stated, consists of the novel devices, combinations of devices and arrangement of parts hereinafter described and defined in the claims.

The improved power-transmission mechanism is capable of various uses both in stationary plants and in portable machines such as automobiles and trucks. It involves a novel combination of variable speed transmission gears and hydraulic pump-acting elements which, by variable action, bring the gears into action so as to apply initial power, in starting the machine, with relatively high power and low speed and to increase the speed of transmission and reduction of power transmitted until the driving and the driven members are locked together for the direct transmission of power as required for high speed drive in automobiles and the like.

The mechanism includes a casing in which the gears and pump-acting elements are contained, and this casing is filled with oil in which the gears constantly run. The pump-acting elements are preferably cylinders and pistons with valves for producing a pump action; that is, a constant direction flow of oil through the cylinders and pistons and a continuous circulation of oil within the casing. The casing is a revoluble element. The driving element is preferably and usually a motor driven shaft. The shaft, for convenience of description, will hereinafter be usually designated as the driving element, and the casing, or a part connected thereto and driven therefrom, as the driven element; but the order of operation can be reversed; that is, the casing, or a part connected thereto, may become the driving element, and the shaft the driven element.

The invention is illustrated in the accompanying drawings, wherein like characters indicate like parts throughout the several views.

Referring to the drawings.

Figure 1:
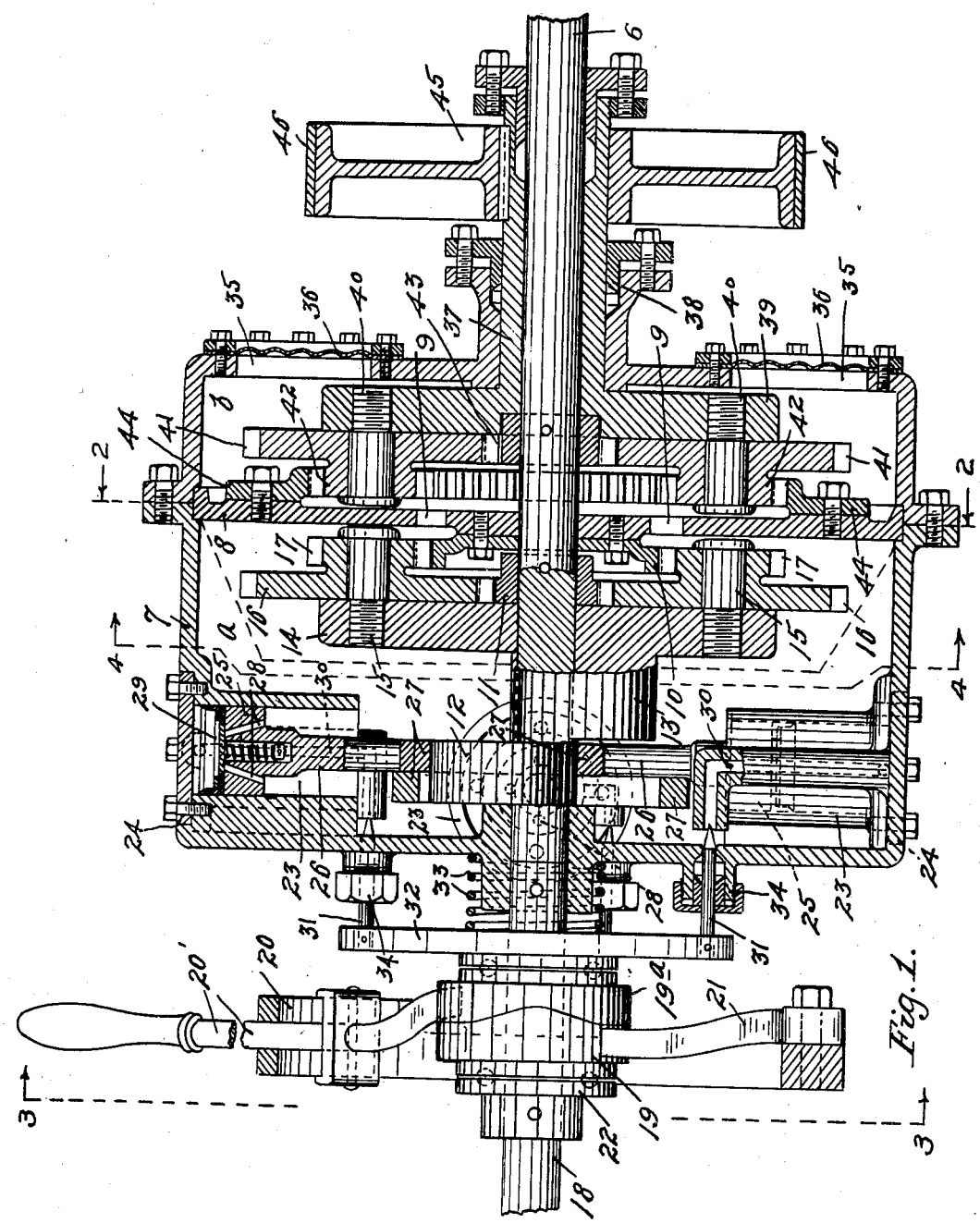
Fig. 1 is a view chiefly in vertical axial section, but with some parts shown in full, illustrating the invention.
Figure 3:
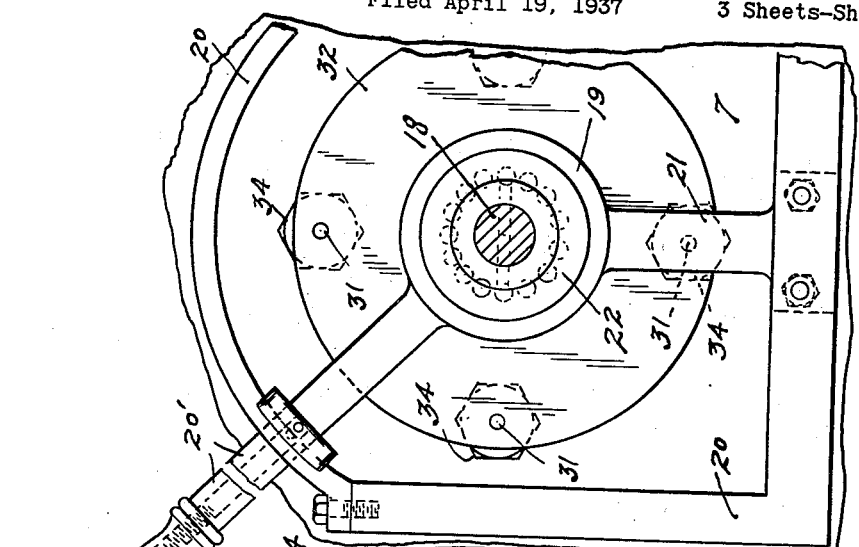
Fig. 3 is a view in elevation looking from the left toward the right from the line marked 3—3 on Fig. 1.
Figure 2:
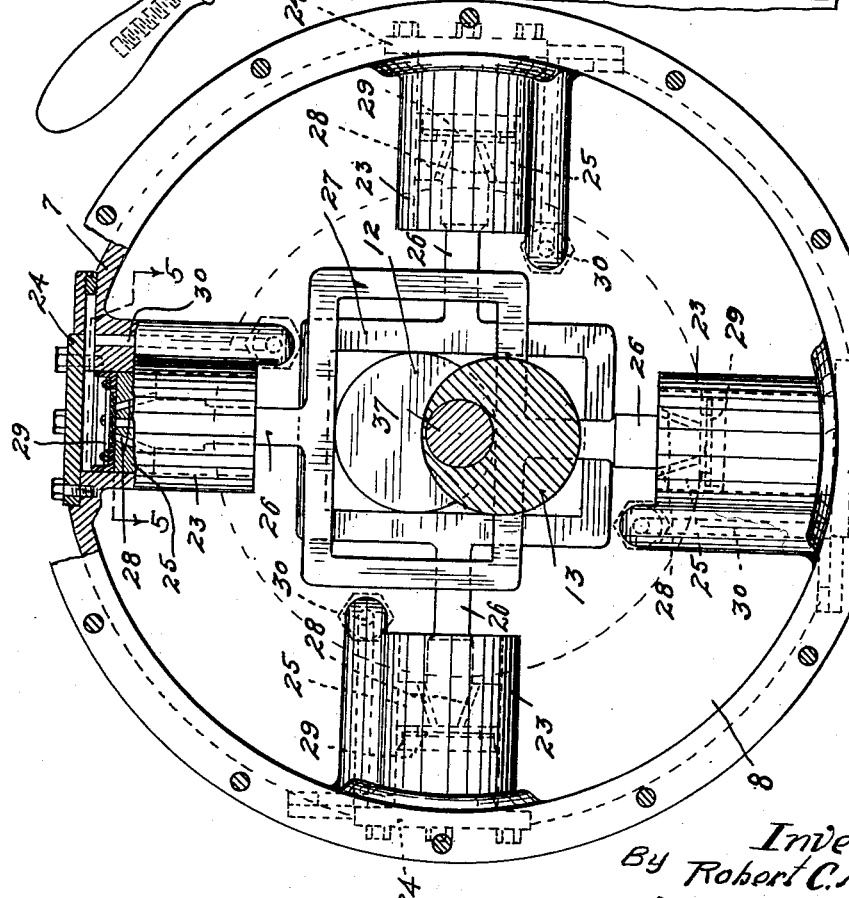
Fig. 2 is a section taken on the irregular line 2—2 of Fig. 1, some parts being broken away and sectioned beyond that line.
Figure 4:
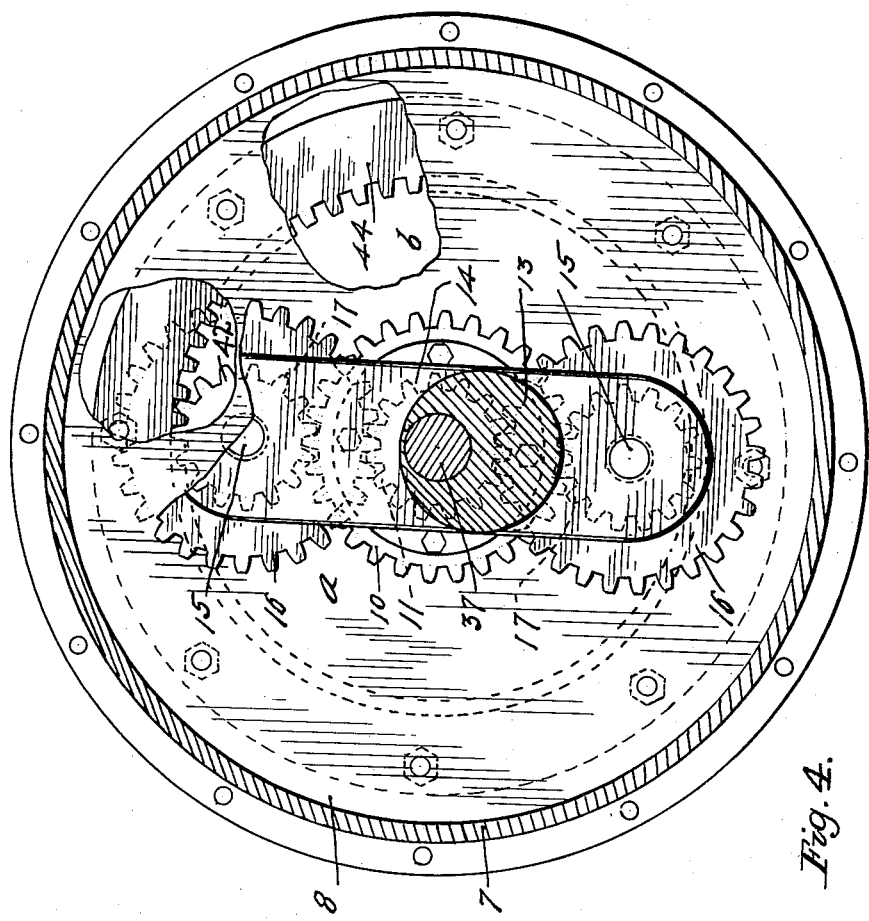
Fig. 4 is a section taken on the line 4—4 of Fig. 1, some parts being broken away.
Figure 5:
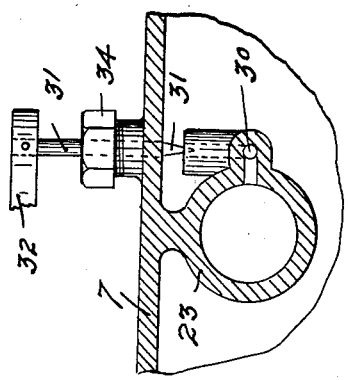
Fig. 5 is a fragmentary section taken on the line 5—5 of Fig. 2.

The member assumed to be the primary driving element of the transmission mechanism is a shaft 6 mounted in suitable bearings, not shown, but extended axially into a revoluble casing 7 that is adapted to contain lubricating oil. The mechanism here illustrated includes means for both forward and reverse drive, and, hence, the casing 7 is provided with an intermediate partition or wall 8, which is provided with openings 9 so that oil can flow from the one chamber *a* into the other chamber *b*, or conversely. Loosely surrounding the shaft 6 and rigidly secured to the central partition 8 is an axially located external gear 10, which, of course, revolves with the casing. Keyed to the shaft 6 adjacent the gear 10 is a small spur pinion 11 which, of course, revolves with the said shaft. Loosely journaled on the shaft 6 within the compartment *a* is a wide-faced eccentric 12, the hub of which is in the form of a counter-weight 13 that is rigidly secured to a diametrically projected flange or gear carrier 14, the face of which abuts against the pinion 11. The ends of the flange 14 are provided with headed studs 15, on which are journaled differential gears 16—17. The relatively large gears 16 mesh with the axial pinion 11, while the smaller gears 17 mesh with the gear 10 on the partition 8 of the casing.

The left-hand end of shaft 6, as viewed in Fig. 1, extends beyond the loosely applied eccentric 12 and, as shown, is journaled in the left-hand hub of the casing 7. Aligned with the end of the shaft 6 and keyed or secured to the hub of the casing 7 is a power take-off shaft 18, which, as shown, is journaled in a fixed bearing 19 secured to a fixed support 20 by an arm 21. Just outward of bearing 19 shaft 18, as shown, is provided with a thrust collar 22.

Located within and secured to the casing 7 with their axes radiating from the axis of shaft 6 is a plurality, to wit: four, pump cylinders 23 located 90° apart with their open ends inward. The outer ends of the cylinders 23 are shown as closed by head plates 24 detachably secured to the exterior of the casing. Working within the cylinders 23 are pump pistons 25, diametrically opposite members of which are connected to the outer ends of the diametrically opposite arms 26 of cross heads or yokes 27. For the four cylinders there are two of the said cross heads with projecting arms, and the two cross heads 27 engage and are operated upon by the wide-faced eccentric 12, which, it will be remembered, is normally loose on shaft 6.

Pistons 25 are provided with oil intake ports 28 that are arranged to be opened and closed by valve ports 29. Said valves will open under movements of the piston toward the axis of the shaft 6 and will close under reverse movements.

Each cylinder 23 is provided with a discharge conduit 30 that leads freely from the cylinder and opens into the interior of the casing. The four discharge ports 30 are arranged to be simultaneously closed or simultaneously opened to varying extent by choke-acting valves 31, shown as of the pin type and rigidly secured to a common thrust plate 32, mounted for limited sliding movements on the shaft 18 and yieldingly pressed outward by a coil spring 33. The needle or pin valves 31 work through stuffing boxes 34 on the adjacent side of the casing and project into the interior of the casing and are held aligned with the respective discharge ports 30.

As indicated, the interior of the casing will be completely filled with a light lubricating oil. This oil, under operation of the transmission mechanism, will be more or less heated, causing expansion of the oil. To compensate for this expansion the casing on one side, as shown, is provided with large openings 35 that are tightly closed by corrugated spring steel diaphragms 36 that will yield and compensate for the expansion and contraction of the oil. However, in view of the large body of the oil and the considerably exposed metallic surface for radiation, heating of the oil in this device will be reduced to a minimum and the expansion and contraction thereof will be correspondingly reduced. Mounted on shaft 18 is a cam-acting collar 19a, shown as connected to a lever 20'.

The mechanism so far described is for forward drive. For reverse drive additional elements are provided. These elements, as illustrated in the drawings, are as follows: A sleeve 37 is journaled on the shaft 6 and extended into the casing through a stuffing box 38 in one hub of said casing. Within the casing the sleeve 37 is provided with a diametrically extended flange or gear carrier 39 that is provided at its ends with projecting studs 40, on which are journaled differential gears 41—42. Gears 41 mesh with a pinion 43 keyed or otherwise secured to shaft 6; while the smaller gears or pinions 42 mesh with an internal annular gear 44 rigidly secured to the partition and, hence, secured for rotation with the casing 7.

At its outer end sleeve 37, as shown, is provided with a brake drum 45 that is normally free to rotate but is adapted to be stopped or retired in its rotary movement by a friction device such as a brake band 46.

*Operation*

When the pistons 25 are reciprocated within the cylinders, the oil contained in the casing will, as already stated, be circulated through the several cylinder and piston pumps. When the valves 31 are moved toward the right in respect to Fig. 1, to the limit, they will close the cylinder discharge ports 30 so that oil can not be circulated through the pumps and, hence, the pistons will be locked or held stationary within the respective pistons. When the pistons can not reciprocate the cam 12 can not rotate in respect to the driving shaft 6; when said eccentric can not rotate in respect to the shaft 6, the gear carrying flange 14 can not rotate in respect to said shaft 6; when said gear carrying flange can not rotate in respect to shaft 6, gears 16—17 can not rotate on their own axes; when gears 16—17 can not rotate on their own axes the casing 7 can not rotate in respect to the shaft 6; and when these conditions prevail, the casing and, hence, the power driven shaft 18 will be locked to the driving shaft 6 and the transmission mechanism will then act as a direct drive and the shafts 6 and 18 and the casing will be connected for common rotation.

When the flow through the cylinders is absolutely cut off by closing of the valves 31, the entire transmission mechanism will, as above stated, be locked together and operate as a direct drive. As the valves 31 are progressively moved from the right toward the left, in respect to Fig. 1, flow of the oil through the cylinders will be progressively increased so that the speed of the casing, and hence of shaft 18, will be progressively decreased. If the valves should or could be opened to such extent that there was no resistance to the flow of the oil through the cylinders under the pumping actions, then, of course, no power would be transmitted, but as a matter of fact, there will usually be some resistance to the flow of the oil and hence a transmission of power at that low speed. Of course, this ratio can be varied at will by varying the size of the planetary gear system.

It may be here stated that the hydraulic pump-acting devices, made up, as shown, of the cylinders and pistons, operate as a variable clutch or coupling between the oil containing casing and the driving shaft and that the effective force of this variable or slip connection may be varied from substantially nil to an absolute locking connection between the driving and driven elements. As the valves 31 are moved to progressively close the ports 30, the resistance to the flow of oil through the pumps will increase, and the tendency to cause the casing to rotate with the driving shaft will be increased until, as before stated, the flow of oil is cut off and the mechanism then operates as a direct drive. Obviously, the converse of this statement is true; that is, as the ports 30 are progressively opened by the valves, the speed rate of transmission will be progressively decreased and the power transmitted will be progressively increased. Simultaneous movements of valves 31 toward the right to close the ports 30 will be accomplished whenever the cam-acting collar 19a is oscillated by movement of lever 20'; and retraction of the valves will take place under action of spring 33 whenever the collar 19a is turned back to the position shown in Fig. 1.

As an additional feature I provide means illustrated for reverse drive. Reverse drive is to be accomplished when the valves 31 are positioned to give full opening through ports 30, so that the casing and shaft 18 will be free for backward rotation. Reverse drive is thrown into action by putting friction on the brake drum 45 or otherwise holding the sleeve 37 and gear carrying flange 39 against rotation. When flange 39 is held against rotation pinion 43, acting through differential gears 41—42 and internal gear 44 will be active to rotate casing and shaft 18 in a direction for backing up of an automobile or truck or for reverse rotation of said casing and shaft 18 or for any other purpose that may be required. The two planetary gear systems illustrated operate much alike except that in the first instance the gear 10, carried by the casing, is an external gear, while the gear 44 is an internal gear. When the motion is transmitted through the gears 16—17, the casing and the shaft 18 will be rotated in the same direction as the driving shaft; but when the drive shaft is rotated through the gears 41—42, the casing and the shaft 18 will be driven in a reverse direction from that of the shaft 6.

Since the gears and pistons always run in oil, friction will be reduced to a minimum. Moreover, since there is a large body of oil and the casing has very considerable radiating surface, the heating of the oil will be very slight. The oil pumped through the pumps will be continuously circulated back into the main body of oil, so that the temperature of the oil will be maintained uniform throughout, not only in the chamber or compartment *a* but in the chamber or compartment *b*.

It is important to note that the pump-actuating eccentric or crank-acting element is driven from the gear carrier and hence, is rotated at a much slower speed than the driving shaft. This operates the hydraulic pumps at a relatively low speed and, of course, correspondingly reduces the friction and, hence, the heating action of the oil. Oil is used because of its lubricating quality but, in some instances, and clearly within the scope of the invention, other liquids such as water or water-containing soap may be used. In some instances the mechanism might be arranged to run submerged in the body of water.

What I claim is:

1. In a transmission mechanism, an oil-containing casing, a power shaft extending into said casing and therein provided with a driving pinion, a gear-carrying flange within said casing rotatively mounted on said power shaft, an axial gear within and carried by said casing, a double-faced planetary gear journaled to said gear casing and meshing with the pinion of said shaft and the axial gear of said casing, an eccentric connected to said gear carrier for rotation therewith, a cylinder carried within said casing, a piston in said cylinder operative by rotation of said eccentric, in respect to said casing, said cylinder and piston operating to take in oil from said casing and to discharge the same back into said casing, and means for varying the circulation of oil into and out of said cylinder and to cut off said circulation, to thereby lock said casing and power shaft for common rotation, in further combination with a sleeve normally loose on said power shaft and extended into said casing and therein provided with a gear-carrier flange, a pinion on said power shaft adjacent said last noted gear carrier, an internal annular gear secured within said casing, and a differential gear journaled to said last noted gear carrier and meshing with said internal annular gear of said casing and the last noted pinion on said driving shaft.

2. In a transmission mechanism, an oil-containing casing, a power shaft extending into said casing and therein provided with a driving pinion, a gear-carrying flange within said casing rotatively mounted on said power shaft, an axial gear within and carried by said casing, a double-faced planetary gear journaled to said gear casing and meshing with the pinion of said shaft and the axial gear of said casing, an eccentric connected to said gear carrier for rotation therewith, a cylinder carried within said casing, a piston in said cylinder operative by rotation of said eccentric, in respect to said casing, said cylinder and piston operating to take in oil from said casing and to discharge the same back into said casing, and means for varying the circulation of oil into and out of said cylinder and to cut off said circulation to thereby lock said casing and power shaft for common rotation, in further combination with a sleeve normally loose on said power shaft and extended into said casing and therein provided with a gear-carrier flange, a pinion on said power shaft adjacent said last noted gear carrier, an internal annular gear secured within said casing, a differential gear journaled to said last noted gear carrier and meshing with said internal annular gear of said casing and the last noted pinion on said driving shaft, and frictional brake-acting means for retarding or stopping rotation of said sleeve and the last noted gear-carrier flange.

3. In a transmission mechanism, an oil-containing casing, a power shaft extending into said casing and therein provided with a driving pinion, a gear-carrying flange within said casing rotatively mounted on said power shaft, an axial gear within and carried by said casing, a double-faced planetary gear journaled to said gear casing and meshing with the pinion of said shaft and the axial gear of said casing, an eccentric connected to said gear carrier for rotation therewith, a cylinder carried within said casing, a piston in said cylinder operative by rotation of said eccentric, in respect to said casing, said cylinder and piston operating to take in oil from said casing and to discharge the same back into said casing, and means for varying the circulation of oil into and out of said cylinder and to cut off said circulation, to thereby lock said casing and power shaft for common rotation, in further combination with a sleeve normally loose on said power shaft and extended into said casing and therein provided with a gear-carrier flange, a pinion on said power shaft adjacent said last noted gear carrier, an internal annular gear secured within said casing, a differential gear journaled to said last noted gear carrier and meshing with said internal annular gear of said casing and the last noted pinion on said driving shaft, frictional brake-acting means for retarding or stopping rotation of said sleeve and the last noted gear-carrier flange, said casing having an internal partition to which said annular internal gear is secured, said partition having oil passages for the circulation of oil to both compartments of said casing.

4. In a transmission mechanism, a fluid-containing casing, a power shaft extending into said casing, an eccentric in said casing rotatable on an axis co-incident with said shaft, gear carrying means within said casing rotatable on an axis common to that of said shaft and eccentric, a planetary gear system affording a transmission connection between said shaft and casing, between said shaft gear carrying means and casing, and between said casing and eccentric, said gear carrying means having a sleeve extending to the exterior of said casing and provided with means for retracting or stopping rotation thereof to produce reverse drive, a cylinder carried by and within said casing, a piston in said cylinder operative by rotation of said eccentric in respect to said casing, said cylinder and piston operative to take fluid from said casing and to discharge the same back into said casing, and means for varying the circulation of the fluid through said cylinder.

5. In a transmission mechanism, a fluid-containing casing, a power shaft extending into said casing, an eccentric in said casing rotatable on an axis co-incident with said shaft, gear carrying means within said casing rotatable on an axis common to that of said shaft and eccentric, a planetary gear system affording a transmission connection between said shaft and casing, between said shaft gear carrying means and casing, and between said casing and eccentric, said gear carrying means having a sleeve extending to the exterior of said casing and provided with means for retracting or stopping rotation thereof to produce reverse drive, a cylinder carried by and within said casing, a piston in said cylinder operative by rotation of said eccentric in respect to said casing, said cylinder and piston operative to take fluid from said casing and to discharge the same back into said casing, and means for varying the circulation of the fluid through said cylinder, and a second power shaft secured to said casing for rotation therewith, said two shafts having aligned axes and extending in opposite directions from said casing.

ROBERT C. MEALEY.